United States Patent
Mori et al.

[11] Patent Number: 5,625,486
[45] Date of Patent: Apr. 29, 1997

[54] REAL IMAGE TYPE VIEWFINDER OPTICAL SYSTEM

[75] Inventors: Akira Mori, Kawasaki; Seiji Shimizu, Hachioji, both of Japan

[73] Assignee: Olympus Optical Co., Ltd., Tokyo, Japan

[21] Appl. No.: 436,820

[22] Filed: May 8, 1995

[30] Foreign Application Priority Data

May 10, 1994 [JP] Japan ................................ 6-119662
Jul. 5, 1994 [JP] Japan ................................ 6-153448

[51] Int. Cl.$^6$ ............................................ G03B 13/08
[52] U.S. Cl. .................................... 359/431; 359/835
[58] Field of Search ............................ 359/431, 730, 359/836, 834, 837, 835; 354/224, 222, 225, 219

[56] References Cited

U.S. PATENT DOCUMENTS

| | | | |
|---|---|---|---|
| 4,367,949 | 1/1983 | Lavering | 359/835 |
| 4,795,235 | 1/1989 | Spitzberg | 359/431 |
| 5,034,763 | 7/1991 | Inabata | 359/431 |
| 5,130,845 | 7/1992 | Ruben | 359/835 |
| 5,235,460 | 8/1993 | Abe | 359/431 |
| 5,491,528 | 2/1996 | Takato et al. | 359/835 |

FOREIGN PATENT DOCUMENTS

| | | |
|---|---|---|
| 63-226616 | 9/1988 | Japan . |
| 419705 | 1/1992 | Japan . |
| 6300966 | 10/1994 | Japan . |

Primary Examiner—Timothy P. Callahan
Assistant Examiner—Eunja Shin
Attorney, Agent, or Firm—Cushman, Darby & Cushman IP Group of Pillsbury Madison & Sutro LLP

[57] ABSTRACT

A real image type viewfinder optical system configured so as to allow observation, through an eyepiece, of an image of an object which is formed by an objective, and inverted by image inverting optical members in both a vertical direction and a horizontal direction. This viewfinder optical system uses an objective which is formed as a member integrated with a prism having a first reflecting surface of the image inverting optical members and an eyepiece which is formed as a member integrated with a prism having a final reflecting surface of the image inverting optical members.

17 Claims, 8 Drawing Sheets

REAL IMAGE TYPE VIEWFINDER OPTICAL SYSTEM

BACKGROUND OF THE INVENTION a) Field of the Invention

The present invention relates to a real image type viewfinder optical system which is preferable for use with compact cameras and thin cameras in particular such as photographic cameras and video cameras.

b) Description of the Prior Art

Under the present circumstances where image reflecting optical members such as porro prisms which are effectively usable for making display members such as visual field frames more legible and employing lens elements having smaller diameters can be manufactured by monolithic molding of plastic materials, lens shutter cameras adopt more and more real image type viewfinder optical systems such as the keplerian viewfinder optical system disclosed by Japanese Patent Kokai Publication No. Sho 63-226,616 in place of virtual image type viewfinder optical systems such as Albada type and inverted Galilean type viewfinder optical systems.

The conventional real image type viewfinder optical system has a fundamental composition illustrated in FIG. 1, wherein a reference numeral 1 represents an objective, a reference numeral 2 designates an image inverting optical member configured as a porro prism and a reference numeral 3 denotes an eyepiece. That is to say, the conventional real image type viewfinder optical system has a fundamental composition wherein the objective and the eyepiece are disposed before and after respectively the porro prism, thereby inevitably having large thickness or being limited in shortening of a length thereof in a direction along an optical axis thereof.

Further, the real image type viewfinder optical system disclosed by Japanese Patent Kokai Publication No. Sho 63-226,616 is configured so that the objective forms an image in an image inverting member 2 and a visual field frame is located on the imaging surface. However, this conventional example required to divide, into two parts, a porro prism which can be molded or shaped as an integral member, thereby being composed of a large number of parts and undesirable from a viewpoint of the shortening of a length thereof in the direction along an optical axis thereof.

As a viewfinder optical system which has solved the problem posed by the conventional example described above, there is known the viewfinder optical system disclosed by Japanese Patent Kokai Publication No. Hei 4-19,705 in which an eyepiece and a final reflecting surface of an image inverting optical member are integrated with each other so as to form a prism. This conventional example has a composition illustrated in FIG. 2. The viewfinder optical system exhibits a certain effect for shortening a length thereof in the direction along an optical axis thereof, but does not permit shortening its length sufficiently due to a fact that it allows an objective disposed therein to protrude on the object side.

Further, known as another viewfinder optical system configured for compactness is the one disclosed by Japanese Patent Kokai Publication No. Hei 6-300,966 obtained by the applicant of the present invention. This viewfinder optical system uses an objective which is integrated with an image iverting member so as to form a prism 4 having a first reflecting surface, thereby exhibiting effects for shortening a length of the optical system in the direction along an optical axis Lc thereof and forming a thin porro prism. However, this viewfinder optical system cannot be configured thinner since it requires a certain minimum length as measured from a surface of emergence 4a of a porro prism 4 to a final surface 5a of an eyepiece in the direction along an optical axisl Lc thereof as shown in FIG. 3.

SUMMARY OF THE INVENTION

A primary object of the present invention is to provide a real image type viewfinder optical system which is compact and composed of a small number of parts while maintaining favorable optical performance, and has a wide field angle, a high magnification, a simple composition and a small total length.

The real image type viewfinder optical system according to the present invention comprises an objective, image inverting optical members for inverting an image of an object formed by the objective in both vertical and horizontal directions, and an eyepiece for permitting observation of the image of the object formed by the objective; and is characterized in that the objective is formed as an integral prism comprising a first reflecting surface of the image inverting optical members, and that the eyepiece is formed as an integral prism comprising a final reflecting surface of the image inverting optical members.

Describing more concretely, the real image type viewfinder optical system according to the present invention has such a composition, for example, as that shown in FIG. 4. In this drawing, reference symbols $r_1$ and $r_2$ represent a surface of incidence and a surface of emergence respectively of the objective, reference symbols $r_2$ and $r_4$ designate a surface of incidence and a surface of emergence respectively of the eyepiece, and reference symbols $M_1$, $M_2$, $M_3$ and $M_4$ denote a first reflecting surface, a second reflecting surface, a third reflecting surface and a fourth reflecting surface respectively.

In the real image type viewfinder optical system according to the present invention, the objective is configured as a prism 11 which comprises the first reflecting surface $M_1$ and the eyepiece is configured as a prism 12 which comprises the fourth reflecting surface $M_4$ as described above. In other words, the prism 11 has a convex surface $r_1$, a slant totally reflecting surface $M_1$ and a convex surface $r_2$ which are traced on the left side, right side and underside respectively in the drawing; and composes an objective which has the surface of incidence $r_1$ and the surface of emergence $r_2$. Further, the prism 12 has a convex surface $r_4$, a slant totally reflecting surfaces $M_2$ and $M_3$ which are opposed to each other, a slant totally reflecting surface $M_4$ and a convex surface $r_5$; and composes an eyepiece which has the surface of incidence $r_4$ and the surface of emergence $r_5$. The real image type viewfinder optical system according to the present invention has a composition wherein the objective comprises the first reflecting surface, and the eyepiece comprises at least the fourth reflecting surface and may additionally have the second reflecting surface as well as the third reflecting surface.

It is possible to configure the real image type viewfinder optical system according to the present invention so as to permit adjusting diopter and changing a magnification thereof while maintaining its compactness by disposing a field lens between the surfaces $r_2$ and $r_4$ shown in FIG. 4 so that the field lens is movable along an optical axis of the optical system.

Further, it is possible to configure the eyepiece so as to exhibit an effect to correct aberrations which are apt to be produced in the viewfinder optical system composed of a small number of lens elements by using a cemented lens component in the eyepiece which is integrated so as to comprise the reflecting surfaces. Furthermore, the viewfinder optical system can be configured so as to have high optical performance by composing the cemented lens component of three lens elements.

DETAILED DESCRIPTION OF THE PREFERRED EMBODIMENTS

Now, the viewfinder optical system according to the present invention will be described more detailedly below with reference to the preferred embodiments illustrated in the accompanying drawings.

Figure 1:
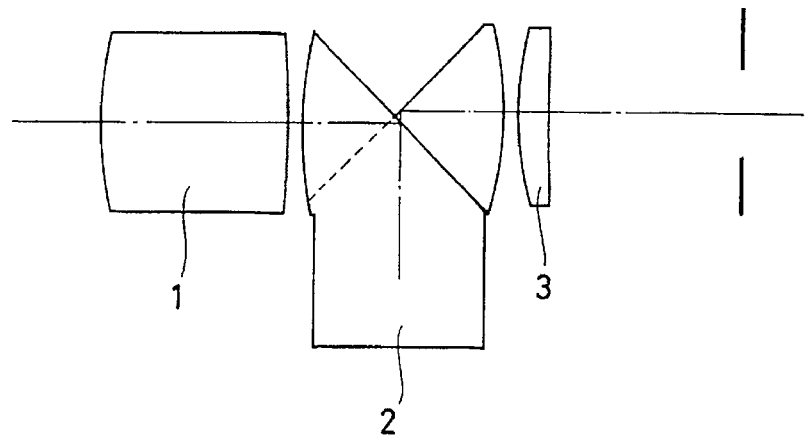
FIG. 1 shows a sectional view illustrating a composition of a conventional real image type viewfinder optical system.
Figure 2:
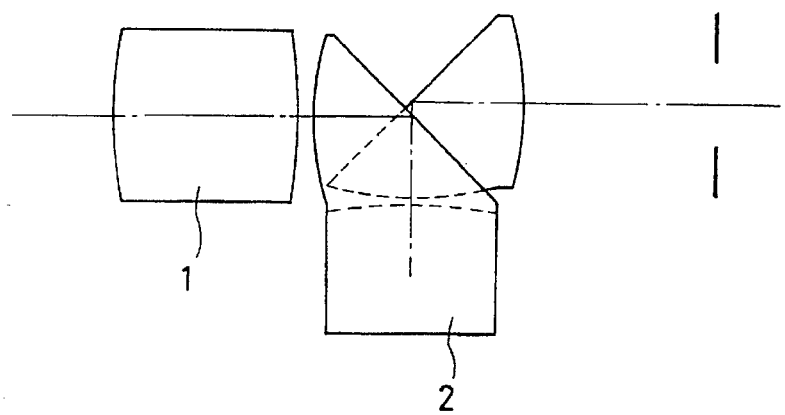
FIG. 2 shows a sectional view illustrating a composition of another conventional real image type viewfinder optical system.
Figure 3:
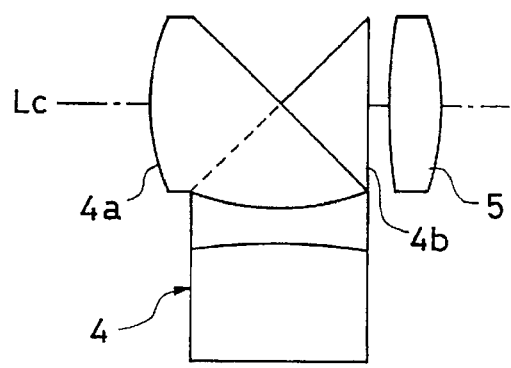
FIG. 3 shows a sectional view illustrating a composition of still another conventional real image type viewfinder optical system.
Figure 4:
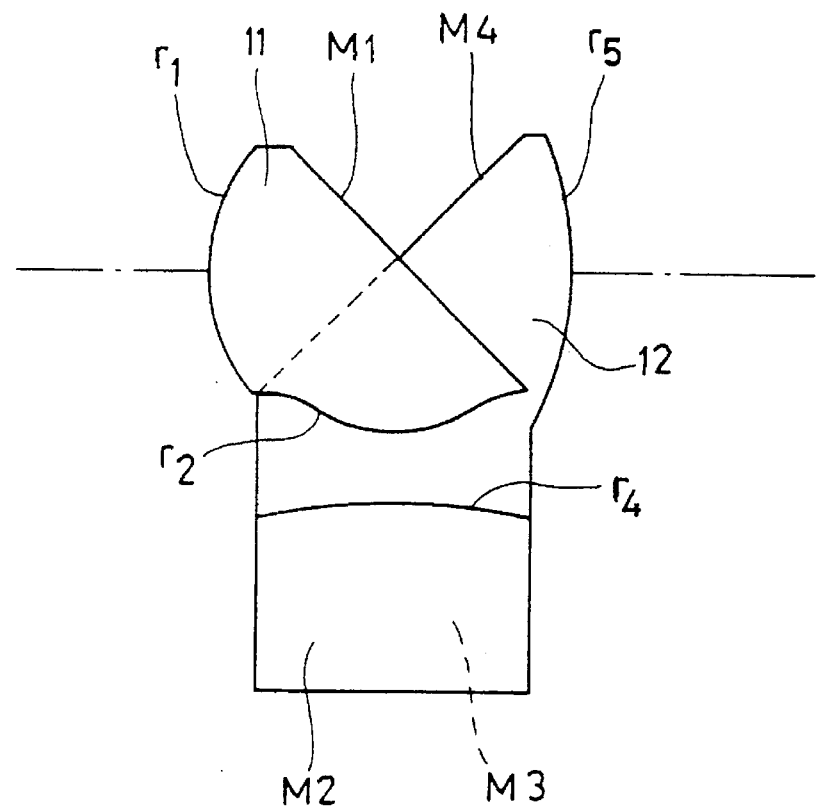
FIG. 4 shows a sectional view illustrating a composition of a first embodiment of the real image type viewfinder optical system according to the present invention.
Figure 5:
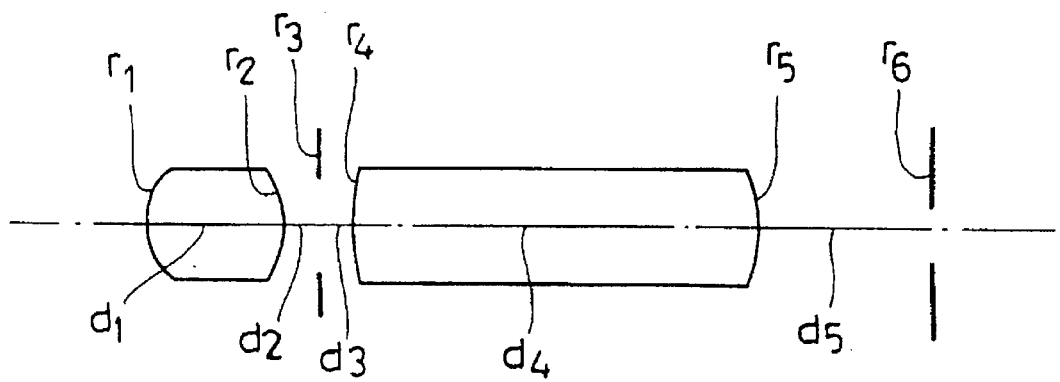
FIG. 5 shows a development view illustrating the first embodiment of the present invention.

A first embodiment of the viewfinder optical system according to the present invention has a fundamental composition illustrated in FIG. 4 and shown in a developed condition thereof in FIG. 5. Speaking concretely, a surface $r_1$ and another surface $r_2$ are formed as a surface of incidence and a surface of emergence respectively of an objective, which has a first reflecting surface between the surface of incidence and the surface of emergence. The first reflecting surface is integrated with the objective so as to form a prism 11. Further, a surface $r_4$ and another surface $r_5$ are a surface of incidence and a surface of emergence respectively of an eyepiece, which has second, third and fourth surfaces $M_2$, $M_3$ and $M_4$ between the surface of incidence and the surface of emergence thereof. These reflecting surfaces are integrated with the eyepiece so as to form a prism 12. Furthermore, in the first embodiment, a visual field frame ($r_3$ in FIG. 5) is disposed on an intermediate imaging surface which is located between the objective and the eyepiece.

The first embodiment has numeral data listed below:
Embodiment 1
$r_1$=5.7074 (aspherical surface)

| $d_1 = 11.640$ | $n_1 = 1.49241$ | $v_1 = 57.66$ |
| --- | --- | --- |

$r_2$=−6.1452 (aspherical surface)
$d_2$=2.850
$r_3$=∞ (intermediate imaging surface)
$d_3$=3.000
$r_4$=23.2658 (aspherical surface)

| $d_4 = 34.163$ | $n_2 = 1.49241$ | $v_2 = 57.66$ |
| --- | --- | --- |

$r_5$=−12.9811 (aspherical surface)
$d_5$=15.000
$r_6$ (eye point)
aspherical surface coefficients
(1st surface)
P=0.2162, E=−0.22593×10$^{-2}$, F=0.16346×10$^{-3}$
G=−0.89885×10$^{-5}$, H=0.34262×10$^{-6}$
(2nd surface)
P=1.6445, E=0.16136×10$^{-2}$, F=0.10793×10$^{-3}$
G=−0.10240×10$^{-4}$, H=0.36973×10$^{-6}$
(4th surface)
P=1.7978, E=−0.25619×10$^{-4}$, F=−0.14114×10$^{-5}$
G=0.22760×10$^{-7}$, H=−0.28063×10$^{-9}$
(5th surface)
P=1.0000, E=0.72202×10$^{-4}$, F=0.14167×10$^{-5}$ G=0.27998× 10$^{-7}$, H=0.65208×10$^{-9}$ β=0.36, $f_o$=8.89, $f_E$=24.56, 2ω=54°
wherein reference symbols $r_1$, $r_2$, . . . represent radii of curvature on respective lens components, reference symbols $d_1$, $d_2$, . . . designate airspaces reserved between the respective lens components, reference symbols $n_1$, $n_2$, . . . denote refractive indices of the respective lens components, reference symbols $v_1$, $v_2$ represent Abbe's numbers of the respective lens components (prisms), a reference symbol β designates a magnification of the viewfinder optical system, a reference symbol $f_o$ denotes a focal length of the objective, a reference symbol $f_E$ represents a focal length of the eyepiece and a reference symbol 2ω designates a field angle of incidence.

Figure 6:
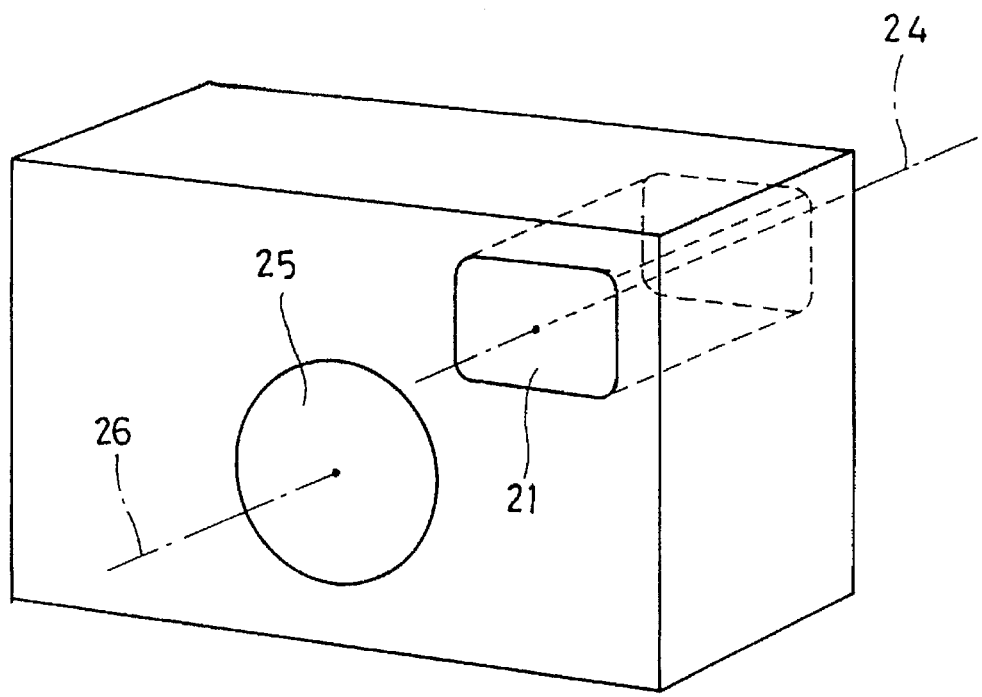
FIG. 6 and FIG. 7 show diagrams schematically illustrating a camera which is equipped with the real image type viewfinder optical system according to the present invention.
Figure 7:
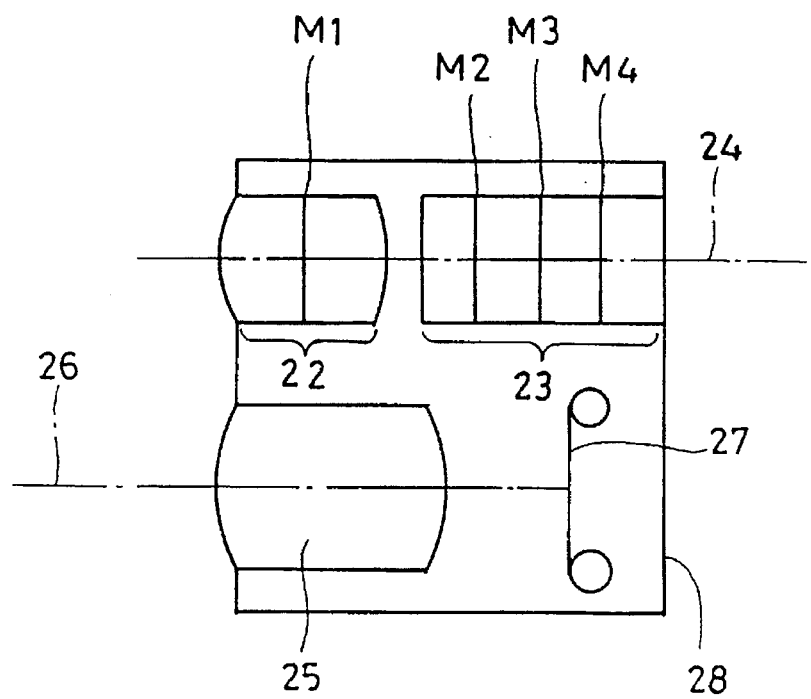

A camera equipped with the real image type viewfinder optical system according to the present invention is schematically shown in FIG. 6 and FIG. 7, wherein a reference numeral 21 represents a real image type viewfinder optical system which consists of an objective 22 and an eyepiece 23.

Further, a reference numeral 24 represents an optical axis of the viewfinder optical system, a reference numeral 25 designates a photographic lens system, a reference numeral 26 denotes an optical axis of the photographic lens system, a reference numeral 27 represents a film and a reference numeral 28 designates a camera body. Reference symbols $M_1$, $M_2$, $M_3$ and $M_4$ used in FIG. 7 represent a first reflecting surface, a second reflecting surface, a third reflecting surface and a fourth reflecting surface respectively disposed in the viewfinder optical system according to the present invention.

Figure 8:
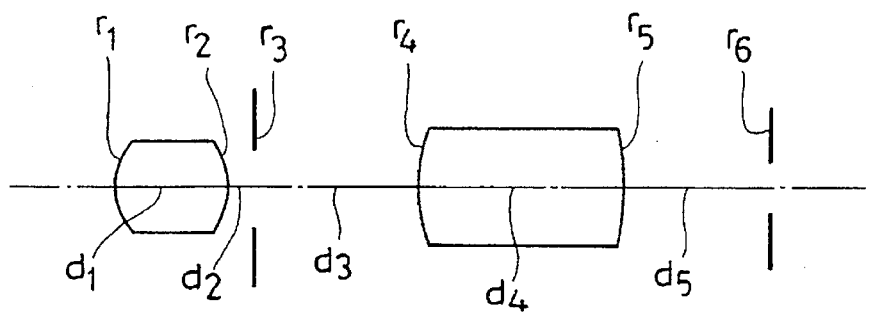
FIG. 8 shows a development view illustrating a second embodiment of the viewfinder optical system according to the present invention.

A second embodiment of the viewfinder optical system according to the present invention has a composition illustrated in a developed condition thereof in FIG. 8. In the second embodiment, a surface of incidence ($r_1$), a first reflecting surface $M_1$ and a surface of emergence ($r_2$) are integrated with the objective so as to form a prism, a second reflecting surface $M_2$ is configured as a hollow reflecting surface, and a surface of incidence ($r_4$), a third reflecting surface $M_3$, a fourth reflecting surface $M_4$ and a surface of emergence ($r_5$) of an eyepiece are integrated with the eyepiece so as to form a prism. In the second embodiment, a visual field frame ($r_3$) is disposed on an intermediate imaging surface which is located between the objective and the second reflecting surface $M_2$.

The second embodiment of the present invention has numerical data which is listed below:

Embodiment 2
$r_1=5.6903$ (aspherical surface)

| $d_1 = 11.640$ | $n_1 = 1.49241$ | $v_1 = 57.66$ |
| --- | --- | --- |

$r_2=-6.1681$ (aspherical surface)
 $d_2=2.850$
$r_3=\infty$ (intermediate imaging surface)
 $d_3=16.400$
$r_4=16.6575$ (aspherical surface)

| $d_4 = 21.040$ | $n_2 = 1.49241$ | $v_2 = 57.66$ |
| --- | --- | --- |

Figure 9:
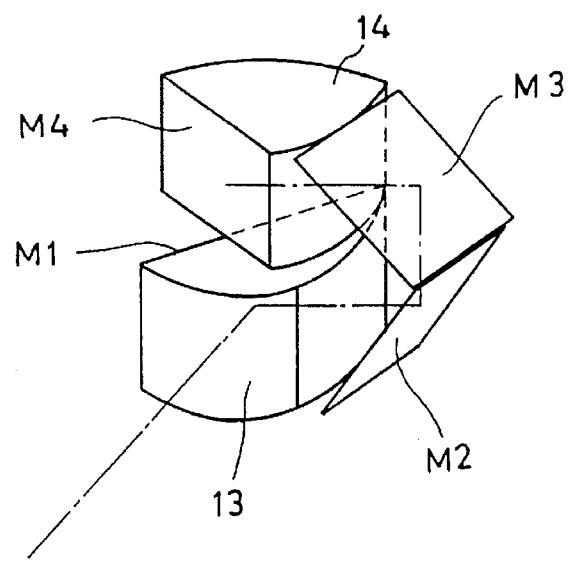
FIG. 9 shows a perspective view illustrating a composition of a third embodiment of the viewfinder optical system according to the present invention.
Figure 10:
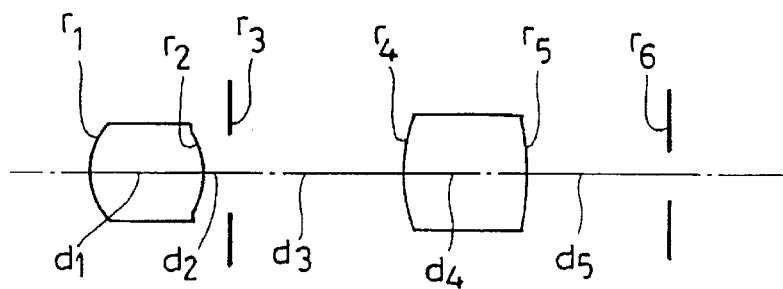
FIG. 10 shows a development view illustrating the third embodiment of the present invention.

$r_5=-23.1695$ (aspherical surface)
 $d_5=15.000$
$r_6$ (eye point)
aspherical surface coefficients
(1st surface)
$P=0.3463$, $E=-0.21549\times10^{-2}$, $F=0.16141\times10^{-3}$
$G=-0.74217\times10^{-5}$, $H=0.20447\times10^{-6}$
(2nd surface)
$P=1.6794$, $E=0.14189\times10^{-2}$, $F=0.11025\times10^{-3}$
$G=-0.10161\times10^{-4}$, $H=0.36684\times10^{-6}$
(4th surface)
$P=1.8088$, $E=-0.25206\times10^{-4}$, $F=-0.14082\times10^{-5}$
$G=0.22519\times10^{-7}$, $H=-0.28974\times10^{-9}$
(5th surface)
$P=1.0000$, $E=0.71679\times10^{-4}$, $F=0.13972\times10^{-5}$ $G=0.28101\times10^{-7}$, $H=0.35384\times10^{-9}$ $\beta=0.37$, $f_o=8.89$, $f_E=23.83$, $2\omega=54°$ A third embodiment of the real image type viewfinder optical system according to the present invention has a composition which is illustrated in a perspective condition in FIG. 9 or traced in a developed condition in FIG. 10. An objective is integrated with a surface of incidence ($r_1$), a first reflecting surface $M_1$ and a surface of emergence ($r_2$) so as to form a prism; a second reflecting surface $M_2$ and a third reflecting surface $M_3$ are configured as hollow totally reflective surfaces; and an eyepiece is integrated with a surface of incidence ($r_4$), a fourth reflecting surface and a surface of emergence ($r_5$) so as to form another prism. In the third embodiment, a visual field frame ($r_3$) is disposed on an intermediate imaging surface which is located between the objective and the second reflecting surface $M_2$.

The third embodiment is configured with the numerical data which is listed below:

Embodiment 3
$r_1=5.6585$ (aspherical surface)

| $d_1 = 11.640$ | $n_1 = 1.49241$ | $v_1 = 57.66$ |
| --- | --- | --- |

$r_2=-6.2126$ (aspherical surface)
 $d_2=2.850$
$r_3=\infty$ (intermediate imaging surface)
 $d_3=17.539$
$r_4=16.4143$ (aspherical surface)

| $d_4 = 12.443$ | $n_2 = 1.49241$ | $v_2 = 57.66$ |
| --- | --- | --- |

Figure 11A:
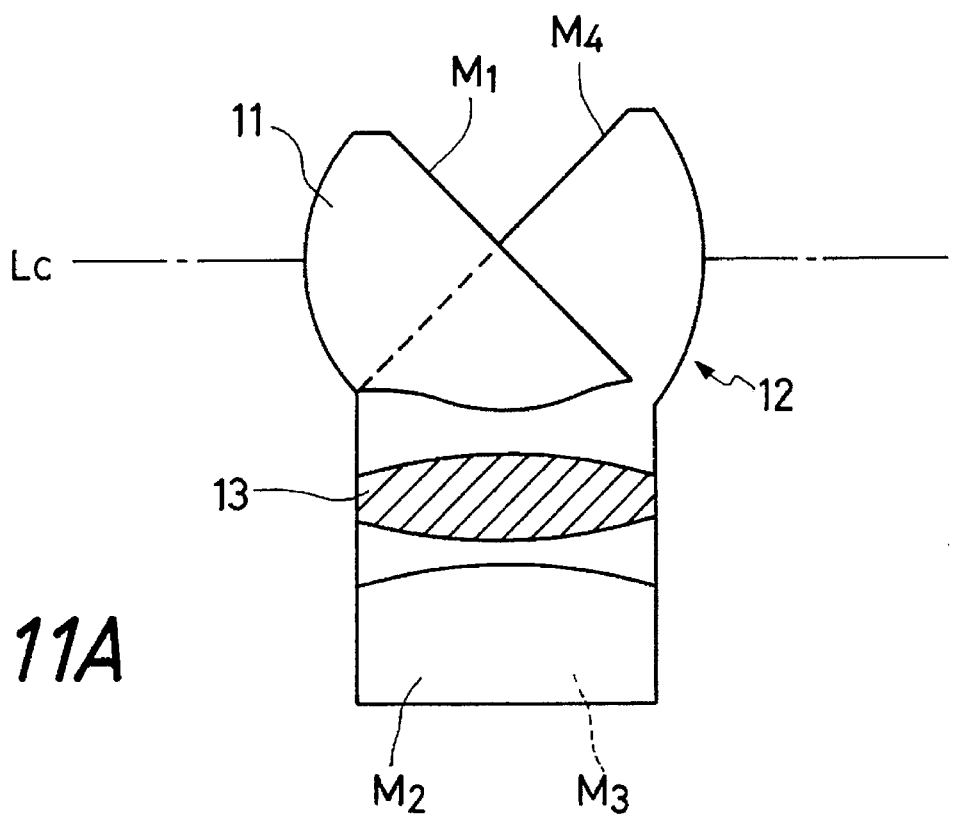
FIG. 11A and FIG. 11B show diagrams illustrating a composition of the real image type viewfinder optical system according to the present invention which comprises a field lens.
Figure 11B:
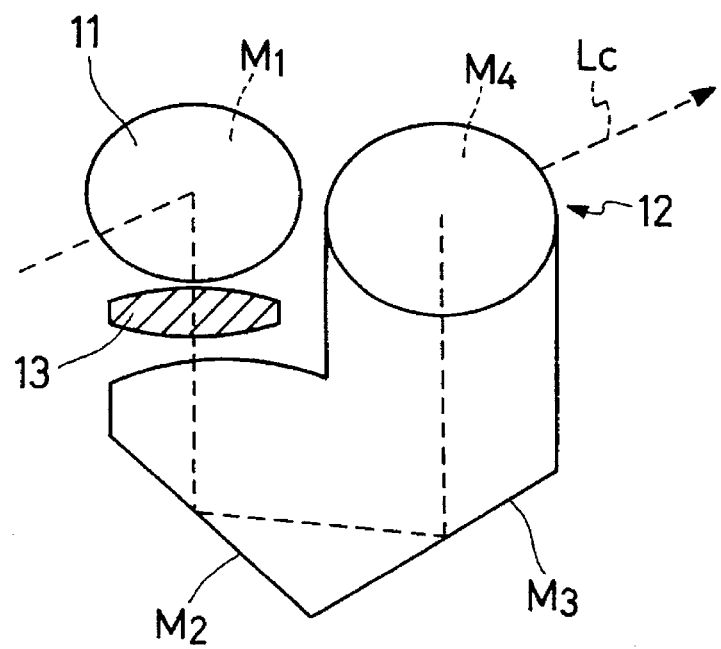

$r_5=-23.0257$ (aspherical surface)
 $d_5=15.000$
$r_6$ (eye point)
aspherical surface coefficients
(1st surface)
$P=0.3366$, $E=-0.21656\times10^{-2}$, $F=0.16653\times10^{-3}$
$G=-0.70907\times10^{-5}$, $H=0.12728\times10^{-6}$
(2nd surface)
$P=1.6250$, $E=0.14678\times10^{-2}$, $F=0.11002\times10^{-3}$ $G=-0.10114\times10^{-4}$, $H=0.36997\times10^{-6}$
(4th surface)
$P=2.0393$, $E=-0.15526\times10^{-4}$, $F=-0.13236\times10^{-5}$
$G=0.20530\times10^{-7}$, $H=-0.59750\times10^{-9}$
(5th surface)
$P=1.0000$, $E=0.60567\times10^{-4}$, $F=0.11080\times10^{-5}$ $G=0.24841\times10^{-7}$, $H=0.22928\times10^{-8}$ $\beta=0.41$, $f_o=8.89$, $f_E=21.72$, $2\omega=55°$ In each of fourth through ninth embodiments of the real image type viewfinder optical system according to the present invention which are to be described below, a field lens 13 which comprises at least one positive lens element and has a positive refractive power as a whole is disposed as shown in FIG. 11A and FIG. 11B between the surface $r_2$ and the surface $r_3$ of the optical system according to the present invention illustrated in FIG. 4, and at least one lens element disposed in this field lens is movable in a direction along an optical axis of the viewfinder optical system.

Figure 12:
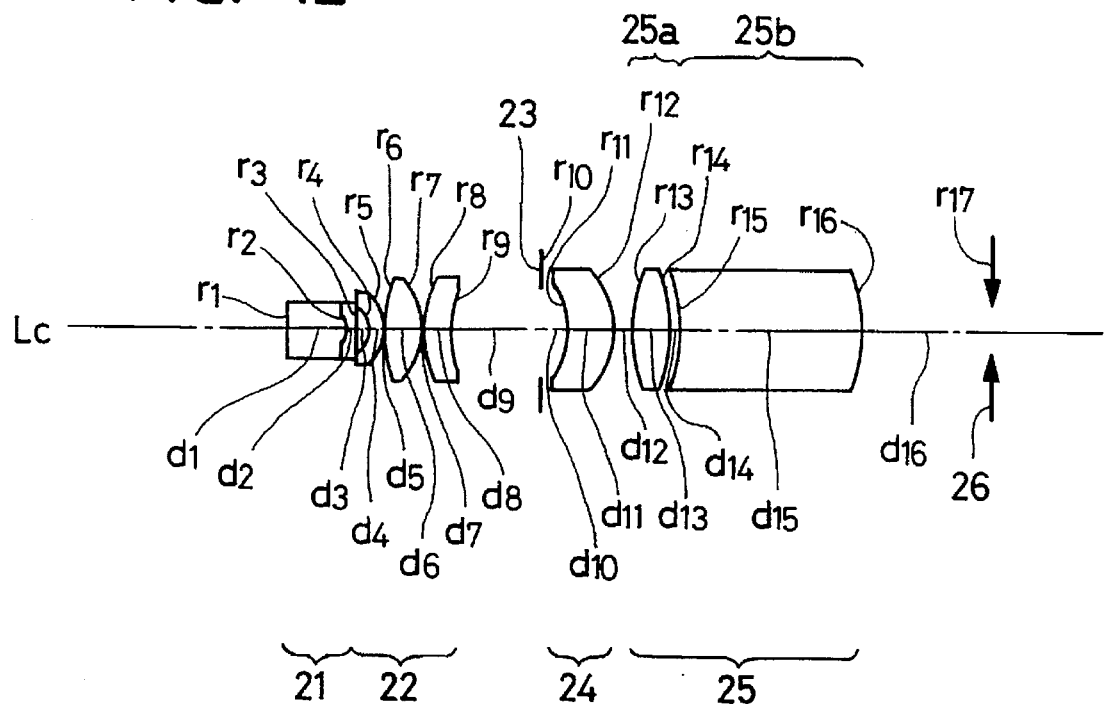
FIG. 12 show a development view illustrating a composition of a fourth embodiment of the viewfinder optical system according to the present invention.

The fourth embodiment is configured as a viewfinder optical system which has a composition illustrated in a developed condition thereof in FIG. 12. A light bundle which is incident on the viewfinder optical system from the object side in FIG. 12 passes through a first powerless prism 21 having a reflecting surface (not shown in FIG. 12 but corresponding to the reflecting surface $M_1$ shown in FIG. 11A and FIG. 11B) and is imaged by an objective 22 onto an intermediate imaging surface ($r_{10}$). Disposed on this intermediate imaging surface is stop 23. Further, a mirror (not shown in FIG. 12 but corresponding to the reflecting surface $M_2$ shown in FIG. 11A and FIG. 11B) is disposed in an airspace $d_9$ reserved between a final surface $r_9$ of the objective 22 and the intermediate imaging surface $r_{10}$ (or the stop 23). A field lens 24 is disposed in the vicinity of the intermediate imaging surface $r_{10}$ (or the stop 23) for converging the light bundle. The fourth embodiment further comprises an eyepiece 25 consisting of a positive lens component 25a and a second prism 25b which has two reflecting surfaces (not shown in FIG. 12 but corresponding to the reflecting surfaces $M_3$ and $M_4$ shown in FIG. 11A and FIG. 11B). A reference numeral 26 used in FIG. 12 represents a location of an exit pupil.

In the fourth embodiment, an image of an object is inverted in the vertical direction by the reflecting surface $M_1$ of the first prism 21 and the emergence side reflecting surface $M_4$ of the second prism 25b; and in the horizontal direction by the reflecting surface $M_2$ located between the objective 22 and the intermediate imaging surface (or the stop 23), and the reflecting surface $M_3$ of the second prism 25b which is dispoed on the side of the positive lens component 25a. Speaking in short, the image of the object is inverted in both the vertical and horizontal directions by these reflecting surfaces. Further, the fourth embodiment permits adjusting diopter thereof and changing a magnification thereof by moving the field lens 24 in a direction along an optical axis Lc.

When the prism 25b which is disposed on the eye side in the eyepiece is prolonged along the optical axis in the fourth embodiment, it permits omitting the airspaces which are conventionally required before and after certain lens components used for composing an eyepiece. Further, the fourth embodiment, which is configured so as to permit adjusting diopter and changing a magnification thereof by moving the field lens in the direction along the optical axis, can be configured as a compact or thin real image type viewfinder optical system which has functions of diopter adjustment, and so on, while maintaining the favorable optical performance thereof.

Listed below is numerical data adopted for the fourth embodiment:

Embodiment 4

$r_1 = \infty$

| $d_1 = 9.650$ | $n_1 = 1.74100$ | $v_1 = 52.68$ |
|---|---|---|

$r_2 = -3.0010$

| $d_2 = 1.000$ | $n_2 = 1.74077$ | $v_2 = 27.79$ |
|---|---|---|

$r_3 = \infty$
$d_3 = 1.600$
$r_4 = -2.9026$

| $d_4 = 2.000$ | $n_3 = 1.71300$ | $v_3 = 53.84$ |
|---|---|---|

$r_5 = -4.6127$
$d_5 = 0.200$
$r_6 = 29.7112$

| $d_6 = 4.000$ | $n_4 = 1.58313$ | $v_4 = 59.36$ |
|---|---|---|

$r_7 = -6.9363$ (aspherical surface)
$d_7 = 0.200$
$r_8 = 12.9332$

| $d_8 = 2.800$ | $n_5 = 1.48749$ | $v_5 = 70.20$ |
|---|---|---|

$r_9 = 5.0355$
$d_9 = 1.250$
$r_{10} = \infty$ (intermediate imaging surface)

$d_{10} = 12.428$
$r_{11} = -9.0117$

| $d_{11} = 5.000$ | $n_6 = 1.72916$ | $v_6 = 54.68$ |
|---|---|---|

$r_{12} = -9.4143$
$d_{12} = 2.500$
$r_{13} = 72.1496$

| $d_{13} = 3.000$ | $n_7 = 1.71300$ | $v_7 = 53.84$ |
|---|---|---|

$r_{14} = -47.4731$
$d_{14} = 1.000$
$r_{15} = -53.7255$

| $d_{15} = 21.649$ | $n_8 = 1.92286$ | $v_8 = 21.29$ |
|---|---|---|

Figure 13:
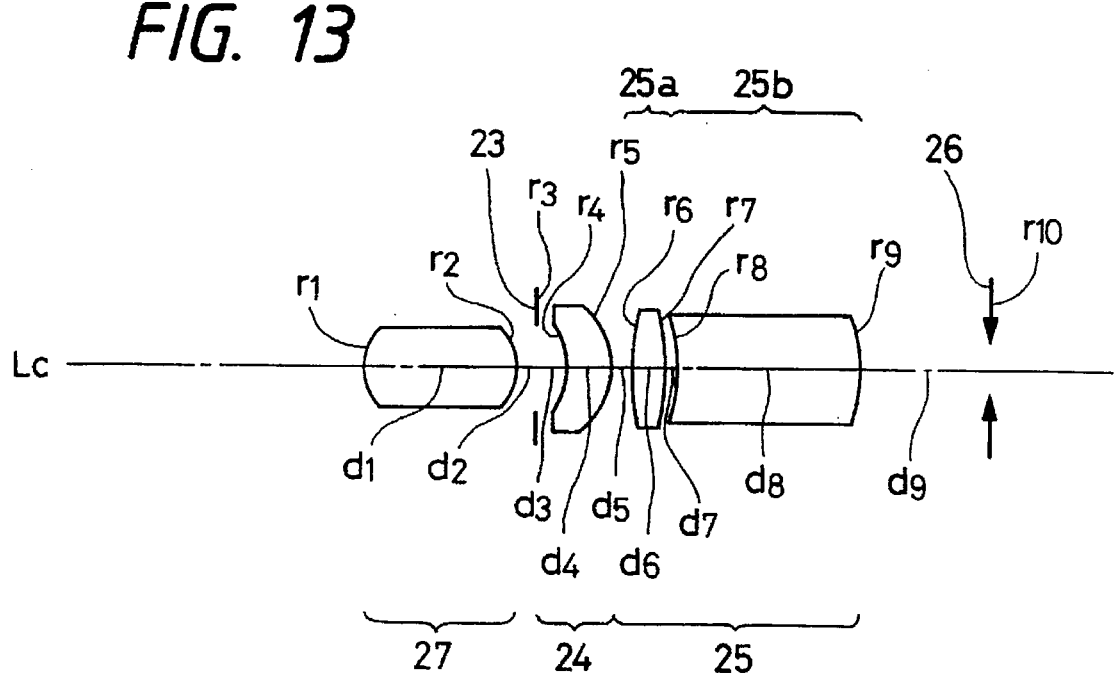
FIG. 13 shows a development view illustrating a composition of a fifth embodiment of the viewfinder optical system according to the present invention.

$r_{16} = -26.1802$ (aspherical surface)
$d_{16} = 15.000$
$r_{17}$ (eye point)
aspherical surface coefficients
(7th surface)
$P=0.9130$, $E=0.32815\times10^{-3}$, $F=0.46590\times10^{-5}$ $G=0.19283\times10^{-7}$, $H=0.13396\times10^{-8}$
(16th surface)
$P=3.2208$, $E=0.26368\times10^{-4}$, $F=-0.34382\times10^{-6}$
$G=0.67396\times10^{-8}$, $H=-0.64121\times10^{-10}$ $\beta=0.5$, $2\omega=56.2°$ A fifth embodiment of the real image type viewfinder optical system according to the present invention has a composition which is illustrated in a developed condition thereof in FIG. 13. The composition of the fifth embodiment is the same as that of the fourth embodiment, except for an objective 27 which is integrated with a prism having a first reflecting surface and a second reflecting surface in the fifth embodiment.

The viewfinder optical system preferred as the fifth embodiment of the present invention has the following numerical data:

Embodiment 5

$r_1 = 10.1727$ (aspherical surface)

| $d_1 = 17.169$ | $n_1 = 1.92286$ | $v_1 = 21.29$ |
|---|---|---|

$r_2 = -6.6274$
$d_2 = 1.646$
$r_3 = \infty$ (intermediate imaging surface)
$d_3 = 3.800$
$r_4 = -11.9717$

| $d_4 = 5.000$ | $n_2 = 1.72916$ | $v_2 = 54.68$ |
|---|---|---|

$r_5 = -8.4262$
$d_5 = 2.500$
$r_6 94.8530$

| $d_6 = 3.000$ | $n_3 = 1.71300$ | $v_3 = 53.84$ |
|---|---|---|

$r_7 = -49.3032$
$d_7 = 1.000$ $r_8=-42.6773$

| $d_8 = 21.673$ | $n_4 = 1.92286$ | $v_4 = 21.29$ |
|---|---|---|

$r_9=-26.3060$ (aspherical surface)
$d_9=15.000$
$r_{10}$ (eye point) aspherical surface coefficients
(1st surface)
P=0.7943, E=$-0.29767\times10^{-4}$, F=$0.63242\times10^{-5}$
G=$-0.79593\times10^{-7}$, H=$-0.45275\times10^{-8}$
(9th surface)
P=0.5196, E=$0.31569\times10^{-4}$, F=$-0.21805\times10^{-6}$
G=$0.12914\times10^{-7}$, H=$-0.73033\times10^{-9}$ β=0.5, 2ω=56.2°

Figure 14:
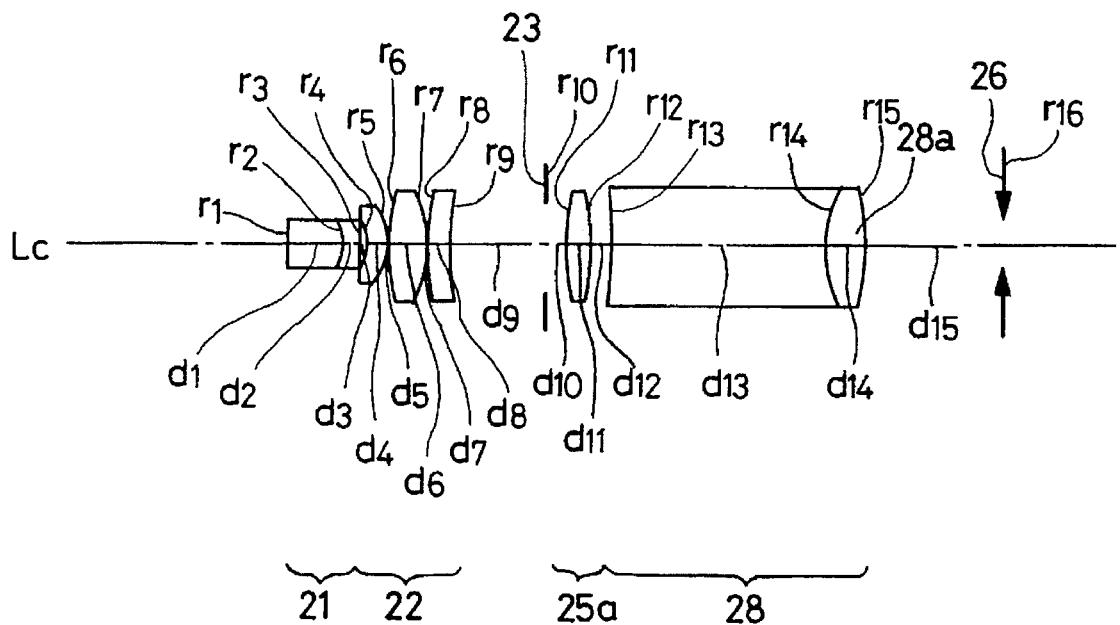
FIG. 14 shows a development view illustrating a composition of a sixth embodiment of the viewfinder optical system according to the present invention.

A sixth embodiment of the real image type viewfinder optical system according to the present invention has a composition which is illustrated in a developed condition thereof in FIG. 14. In the viewfinder optical system preferred as the sixth embodiment, an objective is formed as a member which is integrated with a prism having a third reflecting surface and a fourth (or final) reflecting surface, whereas an eyepiece is configured as a cemented doublet comprising a lens element 28a which is cemented to a surface thereof on the side of emergence (or on the side of an exit pupil 26). Further, the viewfinder optical system preferred as the sixth embodiment uses, as a field lens, a positive lens element 25a disposed in the eyepiece in place of the field lens 24 which is used in the viewfinder optical system shown in FIG. 5. The composition of the sixth embodiment is the same as that of the first embodiment, except for the point which is described above.

Listed below is numerical data adopted for the sixth embodiment:

Embodiment 6

$r_1=\infty$

| $d_1 = 7.950$ | $n_1 = 1.74077$ | $v_1 = 27.79$ |
|---|---|---|

$r_2=-3.0010$

| $d_2 = 1.000$ | $n_2 = 1.74100$ | $v_2 = 52.68$ |
|---|---|---|

$r_3=\infty$
$d_3=1.600$
$r_4=-3.9776$

| $d_4 = 2.000$ | $n_3 = 1.68893$ | $v_3 = 31.08$ |
|---|---|---|

$r_5=-5.7071$
$d_5=0.200$
$r_6=18.9719$

| $d_6 = 4.000$ | $n_4 = 1.56384$ | $v_4 = 60.69$ |
|---|---|---|

$r_7=-9.4531$ (aspherical surface)
$d_7=0.200$
$r_8=25.2689$

| $d_8 = 2.800$ | $n_5 = 1.48749$ | $v_5 = 70.20$ |
|---|---|---|

$r_9=54.4602$
$d_9=1.500$ $r_{10}=\infty$ (intermediate imaging surface)
$r_{10}=11.10$
$r_{11}=18.0675$

| $d_{11} = 3.000$ | $n_6 = 1.46450$ | $v_6 = 65.94$ |
|---|---|---|

$r_{12}=-62.1293$
$d_{12}=2.000$
$r_{13}=-71.1663$

| $d_{13} = 24.362$ | $n_7 = 1.71300$ | $v_7 = 53.84$ |
|---|---|---|

$r_{14}=11.6698$

| $d_{14} = 4.500$ | $n_8 = 1.87400$ | $v_8 = 35.26$ |
|---|---|---|

$r_{15}=-26.9629$ (aspherical surface)
$d_{15}=15.600$
$r_{16}$ (eye point)
aspherical surface coefficients
(7th surface)
P=1.0118, E=$0.26774\times10^{-3}$, F=$0.17775\times10^{-5}$
G=$-0.63230\times10^{-9}$, H=$0.22466\times10^{-9}$
(15th surface)
P=$-0.9045$, E=$0.15438\times10^{-4}$, F=$0.23061\times10^{-6}$
G=$0.28049\times10^{-8}$, H=$-0.82493\times10^{-10}$ β=0.5, 2ω=56.2°

Figure 15:
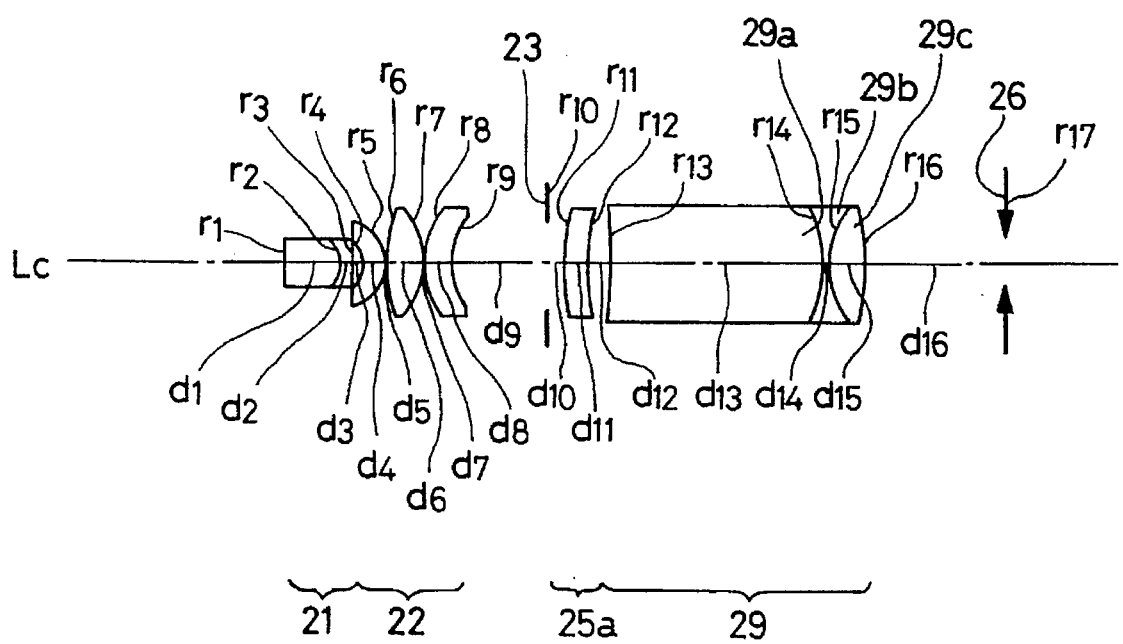
FIG. 15 shows a development view illustrating a composition of a seventh embodiment of the viewfinder optical system according to the present invention.

A seventh embodiment of the viewfinder optical system according to the present invention has a composition which is illustrated in a developed condition thereof in FIG. 15. As seen from this drawing, an eyepiece used in the seventh embodiment is a cemented lens component consisting of three lens elements 29a, 29b and 29c. The composition of the seventh embodiment is the same as that of the sixth embodiment, except for the eyepiece which is described above.

The seventh embodiment is a viewfinder optical system which has the following numerical data:

Embodiment 7

$r_1=\infty$

| $d_1 = 9.650$ | $n_1 = 1.74100$ | $v_1 = 52.68$ |
|---|---|---|

$r_2=-3.0010$

| $d_2 = 1.000$ | $n_2 = 1.74077$ | $v_2 = 27.79$ |
|---|---|---|

$r_3=\infty$
$d_3=2.000$
$r_4=-2.9648$

| $d_4 = 2.000$ | $n_3 = 1.71300$ | $v_3 = 53.84$ |
|---|---|---|

$r_5=-4.7366$
$d_5=0.200$
$r_6=27.3764$

| $d_6 = 4.000$ | $n_4 = 1.58313$ | $v_4 = 59.36$ |
|---|---|---|

$r_7=-7.0221$ (aspherical surface)
$d_7=0.200$ $r_8=10.6760$

| $d_8 = 2.800$ | $n_5 = 1.48749$ | $v_5 = 70.20$ |
|---|---|---|

$r_9=9.1763$
$d_9=2.000$
$r_{10}=\infty$ (intermediate imaging surface)
$d_{10}=10.785$
$r_{11}=24.8497$

| $d_{11} = 3.000$ | $n_6 = 1.72000$ | $v_6 = 50.25$ |
|---|---|---|

$r_{12}=224.9810$
$d_{12}=2.000$
$r_{13}=-137.4614$

| $d_{13} = 23.844$ | $n_7 = 1.72000$ | $v_7 = 50.25$ |
|---|---|---|

$r_{14}=-16.4746$

| $d_{14} = 1.000$ | $n_8 = 1.59551$ | $v_8 = 39.21$ |
|---|---|---|

$r_{15}=9.4942$

| $d_{15} = 4.000$ | $n_9 = 1.80400$ | $v_9 = 46.57$ |
|---|---|---|

$r_{16}=-42.1487$ (aspherical surface)
$d_{16}=15.600$
$r_{17}$ (eye point)
aspherical surface coefficients
(7th surface)
P=0.9096, E=0.34081×10$^{-3}$, F=0.45836×10$^{-5}$, G=0.11858× 10$^{-7}$, H=0.10706×10$^{-8}$
(16th surface)
P=−0.714, E=0.57000×10$^{-4}$, F=0.21186×10$^{-7}$ G=−0.2749× 10$^{-8}$, H=0.49416×10$^{-9}$ β=0.5, 2ω=56.2°

Figure 16:
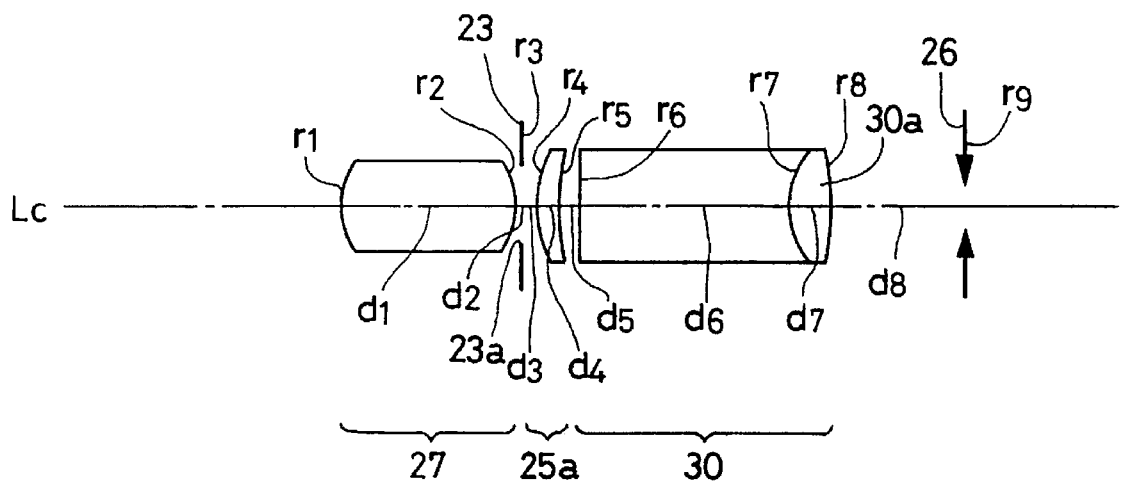
FIG. 16 shows a development view illustrating a composition of an eighth embodiment of the viewfinder optical system according to the present invention.

An eighth embodiment of the real image type viewfinder optical system according to the present invention has a composition illustrated in a developed condition thereof in FIG. 16. As is understood from this drawing, an eyepiece 30 adopted for eighth embodiment is formed as a member integrated with a prism which has a third reflecting surface and a fourth (final) reflecting surface, and is configured as a cemented lens component comprising a lens element 30a on the side of emergence. The eighth embodiment uses, as a field lens, a positive lens component 25a disposed in the eyepiece in place of the field lens 24 in the viewfinder optical system preferred as the second embodiment. The composition of the eighth embodiment is the same as the second embodiment, except for the eyepiece and the field lens which are described above.

The viewfinder optical system preferred as the eighth embodiment of the present invention has the following numerical data:
Embodiment 8
$r_1=10.3776$

| $d_1 = 20.662$ | $n_1 = 1.92286$ | $v_1 = 21.29$ |
|---|---|---|

$r_2=-5.9498$ (aspherical surface)
$d_2=0.500$ $r_3=\infty$ (intermediate imaging surface)
$d_3=2.000$
$r_4=12.8565$

| $d_4 = 3.000$ | $n_2 = 1.46450$ | $v_2 = 65.94$ |
|---|---|---|

$r_5=113.6426$
$d_5=2.000$
$r_6=\infty$

| $d_6 = 24.363$ | $n_3 = 1.71300$ | $v_3 = 53.84$ |
|---|---|---|

$r_7=10.8588$

| $d_7 = 4.500$ | $n_4 = 1.87400$ | $v_4 = 35.26$ |
|---|---|---|

$r_8=-28.1133$ (aspherical surface)
$d_8=15.600$
$r_9$ (eye point)
aspherical surface coefficients
(2nd surface)
P=−0.1558, E=0.14333×10$^{-2}$, F=−0.14895×10$^{-4}$ G=−0.46418×10$^{-6}$, H=−0.14312×10$^{-8}$
(8th surface)
P=−5.2718, E=0.38118×10$^{-4}$, F=0.45504×10$^{-6}$ G=0.34612×10$^{-8}$, H=−0.20531×10$^{-9}$ β=0.5, 2ω=56.2°

Figure 17:
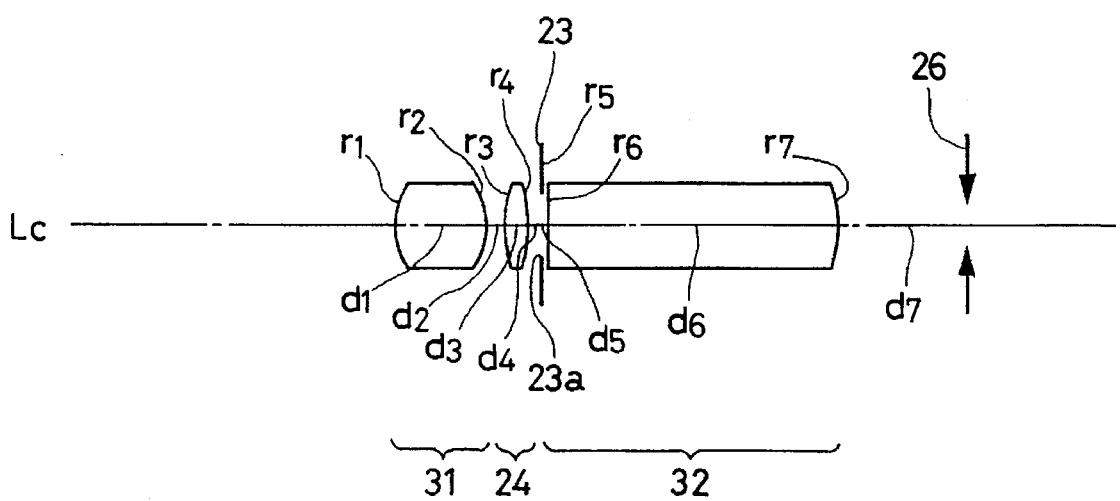
FIG. 17 shows a development view illustrating a composition of a ninth embodiment of the viewfinder optical system according to the present invention.

FIG. 17 shows a composition, in a developed condition, of a viewfinder optical system preferred as a ninth embodiment of the present invention.

As seen from this drawing, the viewfinder optical system preferred as the ninth embodiment images a light bundle incident thereon from an object (not shown) onto an intermediate imaging surface $r_5$ by a prism 31 which has a reflecting surface and a refractive power, and a field lens 24 which is disposed on the object side of the intermediate imaging surface $r_5$ (or a stop 23). Further, the ninth embodiment comprises an eyepiece 32 which is formed as a member integral with a prism having a second reflecting surface, a third reflecting surface and a fourth reflecting surface so that an image is inverted in the horizontal direction and then in the vertical direction. The prism 31 which is configured so as to have the refractive power in the ninth embodiment exhibits an effect which is equivalent to that obtained by the objective used in each of the first through eighth embodiments described above.

In addition, a stop 23a is disposed on the intermediate imaging surface $r_5$.

The ninth embodiment is a viewfinder optical system which has the following numerical data:
Embodiment 9
$r_1=8.9748$

| $d_1 = 11.060$ | $n_1 = 1.49241$ | $v_1 = 57.66$ |
|---|---|---|

$r_2=-6.4204$ (aspherical surface)
$d_2=1.850$
$r_3=16.3146$

| $d_3 = 2.600$ | $n_2 = 1.49241$ | $v_2 = 57.66$ |
|---|---|---|

$r_4=-33.1210$
$d_4=1.850$ $r_5 = \infty$ (intermediate imaging surface)
$d_5 = 0.644$
$r_6 = -481.8133$

| $d_6 = 34.156$ | $n_3 = 1.49241$ | $v_3 = 57.66$ |
|---|---|---|

$r_7 = -11.7328$ (aspherical surface)
$d_7 = 15.000$
$r_8$ (eye point)
aspherical surface coefficients
(2nd surface)
$P = 1.5652$, $E = 0.16827 \times 10^{-2}$, $F = 0.11407 \times 10^{-3}$
$G = -0.13833 \times 10^{-4}$, $H = 0.39785 \times 10^{-6}$
(7th surface)
$P = 1.0733$, $E = 0.53148 \times 10^{-4}$, $F = 0.19985 \times 10^{-5}$ $G = 0.13379 \times 10^{-5}$, $H = -0.13279 \times 10^{-7}$ $\beta = 0.362$, $2\omega = 54°$ The aspherical surfaces used in the embodiments of the present invention described above have shapes which are expressed by the formula shown below:

$$X = \frac{CS^2}{1 + \sqrt{1 - PC^2S^2}} + ES^4 + FS^6 + GS^8 + HS^{10}$$

wherein a direction along the optical axis is taken as the x axis, a direction perpendicular to the optical axis is taken as S, the reference symbol C represents a curvature on a vertex of an aspherical surface of interest, or $C = 1/R$ (R: a paraxial radius of curvature), and the reference symbols P, E, F, G and H designate aspherical surface coefficients.

The viewfinder optical system according to the present invention has favorable optical performance in spite of a wide field angle and a high magnification thereof, is composed of a small number of parts and simple in a composition thereof, and can be manufactured at a low cost and built in compact cameras, in particular those which are exceptionally thin.

We claim:

1. A real image type viewfinder optical system comprising:
    an objective; and
    an optical member which defines a plurality of reflecting surfaces for inverting an image of an object formed by said objective in a vertical direction and a horizontal direction,
    wherein said optical member defines a surface of an eyepiece for allowing observation of the image of the object,
    wherein said objective is formed as a member which is integrated with a prism including a first reflecting surface of said image inverting optical member, and
    wherein said eyepiece is formed as a member which is integrated with a prism including a final reflecting surface of said image inverting optical member.

2. A real image type viewfinder optical system comprising:
    an objective;
    a first reflecting surface;
    a second reflecting surface;
    a third reflecting surface for inverting an image of an object formed by said objective in a vertical direction and a horizontal direction;
    an eyepiece for allowing observation of said image of said object; and
    a field lens which is comprised of a positive lens element, wherein said field lens has a positive refractive power and is disposed between said objective and said eyepiece,
    wherein said positive lens element of said field lens is movable along an optical axis of said viewfinder optical system,
    wherein said first reflecting surface is disposed between a surface of incidence and a surface of emergence of said objective, and
    wherein a fourth reflecting surface is disposed between a surface of incidence and a surface of emergence of said eyepiece.

3. A real image type viewfinder optical system according to claim 2 wherein said second reflecting surface, said third reflecting surface and said fourth reflecting surface are disposed between the surface of incidence and the surface of emergence of said eyepiece.

4. A real image type viewfinder optical system according to claim 1 wherein a field lens which comprises at least one positive lens element and has a positive refractive power as a whole is disposed between said objective and said eyepiece, and wherein at least one lens element disposed in said field lens is movable in a direction along an optical axis of said viewfinder optical system.

5. A real image type viewfinder optical system according to claim 4 wherein said objective is composed of a single lens element.

6. A real image type viewfinder optical system according to claim 4 wherein said objective comprises at least one reflecting surface for erecting said image of the object.

7. A real image type viewfinder optical system according to claim 5 wherein said objective is formed as a member which is integrated with a prism comprising at least one reflecting surface for erecting said image of the object.

8. A real image type viewfinder optical system according to claim 4 wherein a lens element disposed on the side of a pupil in said eyepiece is prolonged along the optical axis of said viewfinder optical system.

9. A real image type viewfinder optical system according to claim 4 configured so as to permit adjusting diopter thereof by moving at least one lens element disposed in said field lens in the direction along the optical axis.

10. A real image type viewfinder optical system according to claim 4 configured so as to permit changing a magnification thereof by moving at least one lens element disposed in said field lens in a direction along the optical axis of said viewfinder optical system.

11. A real image type viewfinder optical system according to claim 4 wherein said eyepiece is composed of a single lens element.

12. A real image type viewfinder optical system according to claim 4 wherein said eyepiece comprises at least one reflecting surface for erecting said image of the object.

13. A real image type viewfinder optical system according to claim 11 wherein said eyepiece is formed as a member which is integrated with a prism comprising at least one reflecting surface for erecting said image of the object.

14. A real image type viewfinder optical system according to claim 11 wherein said eyepiece is a cemented lene component.

15. A real image type viewfinder optical system according to claim 11 wherein said eyepiece is composed of three lens elements.

16. A real image type viewfinder optical system according to claim 4 wherein each of said objective and said eyepiece is composed of a single lens element.

17. A real image type viewfinder optical system according to claim 16 wherein each of said objective and said eyepiece is formed as a member which is integrated with a prism having at least one reflecting surface.

* * * * *